United States Patent
Ortmeier et al.

(10) Patent No.: US 6,408,225 B1
(45) Date of Patent: Jun. 18, 2002

(54) DEVICE AND METHOD FOR BALANCING THE WEIGHT ON A ROBOT ARM

(75) Inventors: Helmut Ortmeier, Weikersheim; Dietrich Engelhardt, Friedberg, both of (DE)

(73) Assignee: Kuka Roboter GmbH (DE)

( * ) Notice: Subject to any disclaimer, the term of this patent is extended or adjusted under 35 U.S.C. 154(b) by 0 days.

(21) Appl. No.: 09/762,373

(22) PCT Filed: Aug. 18, 1999

(86) PCT No.: PCT/EP99/06040
§ 371 (c)(1),
(2), (4) Date: Feb. 2, 2001

(87) PCT Pub. No.: WO00/10777
PCT Pub. Date: Mar. 2, 2000

(30) Foreign Application Priority Data

Aug. 19, 1998 (DE) ......................................... 198 37 595

(51) Int. Cl.⁷ ............................................. G05B 19/04
(52) U.S. Cl. ......................... 700/254; 700/245; 700/260; 700/272; 700/274; 700/275; 700/276; 700/281; 700/287; 192/58.62; 192/58.8; 192/83; 267/140.13; 29/701; 29/715; 901/45; 901/48; 901/49; 74/490.01
(58) Field of Search ................................. 700/245, 254, 700/260, 272, 274, 275, 276, 281, 287, 900; 192/58.62, 58.8, 83; 267/140.13; 29/709, 715; 901/45, 48, 49; 74/490.01

(56) References Cited

U.S. PATENT DOCUMENTS

| | | | |
|---|---|---|---|
| 3,610,611 A | * 10/1971 | Elliott et al. | ............. 267/64.18 |
| 4,229,136 A | 10/1980 | Panissidi | |
| 4,669,192 A | * 6/1987 | Matheson et al. | ............. 33/626 |
| 4,752,200 A | * 6/1988 | Bartschke | ................... 249/66.1 |
| 4,820,114 A | * 4/1989 | Inaba et al. | .................... 33/520 |
| 4,869,444 A | * 9/1989 | Ralph | ..................... 244/104 FP |
| 4,909,367 A | * 3/1990 | Elmer | ..................... 192/103 F |
| 5,039,073 A | * 8/1991 | Reichard et al. | ............. 180/291 |
| 5,088,519 A | * 2/1992 | Giroux et al. | ........... 134/166 C |
| 5,249,631 A | * 10/1993 | Ferren | ........................... 169/24 |
| 5,415,057 A | * 5/1995 | Nihei et al. | ..................... 16/400 |
| 5,509,630 A | * 4/1996 | Bringuier | .................... 182/63.1 |
| 5,625,940 A | * 5/1997 | Butt et al. | ...................... 29/709 |
| 2001/0022112 A1 | * 9/2001 | Bayer et al. | .............. 74/490.01 |

FOREIGN PATENT DOCUMENTS

| | | |
|---|---|---|
| DE | 208 580 | 4/1984 |
| EP | 0 580 850 B1 | * 5/1998 |
| GB | 2 109 337 A | 6/1983 |
| JP | 06 262561 A | 12/1994 |

* cited by examiner

Primary Examiner—William A. Cuchlinski, Jr.
Assistant Examiner—McDieunel Marc
(74) Attorney, Agent, or Firm—McGlew and Tuttle, P.C.

(57) ABSTRACT

The invention relates to a device for balancing the weight carried by a robot arm of a robot. Said device comprises a fluid spring, rotably a pneumatic spring, and a control device for controlling the movements of the robot. The device is characterized by a pressure sensor which measures the pressure of the fluid of the fluid spring. Said device and the method provided for by the invention permit the exact adjustment and balancing of the movements of the robot arm.

14 Claims, 3 Drawing Sheets

DEVICE AND METHOD FOR BALANCING THE WEIGHT ON A ROBOT ARM

Figure 1:
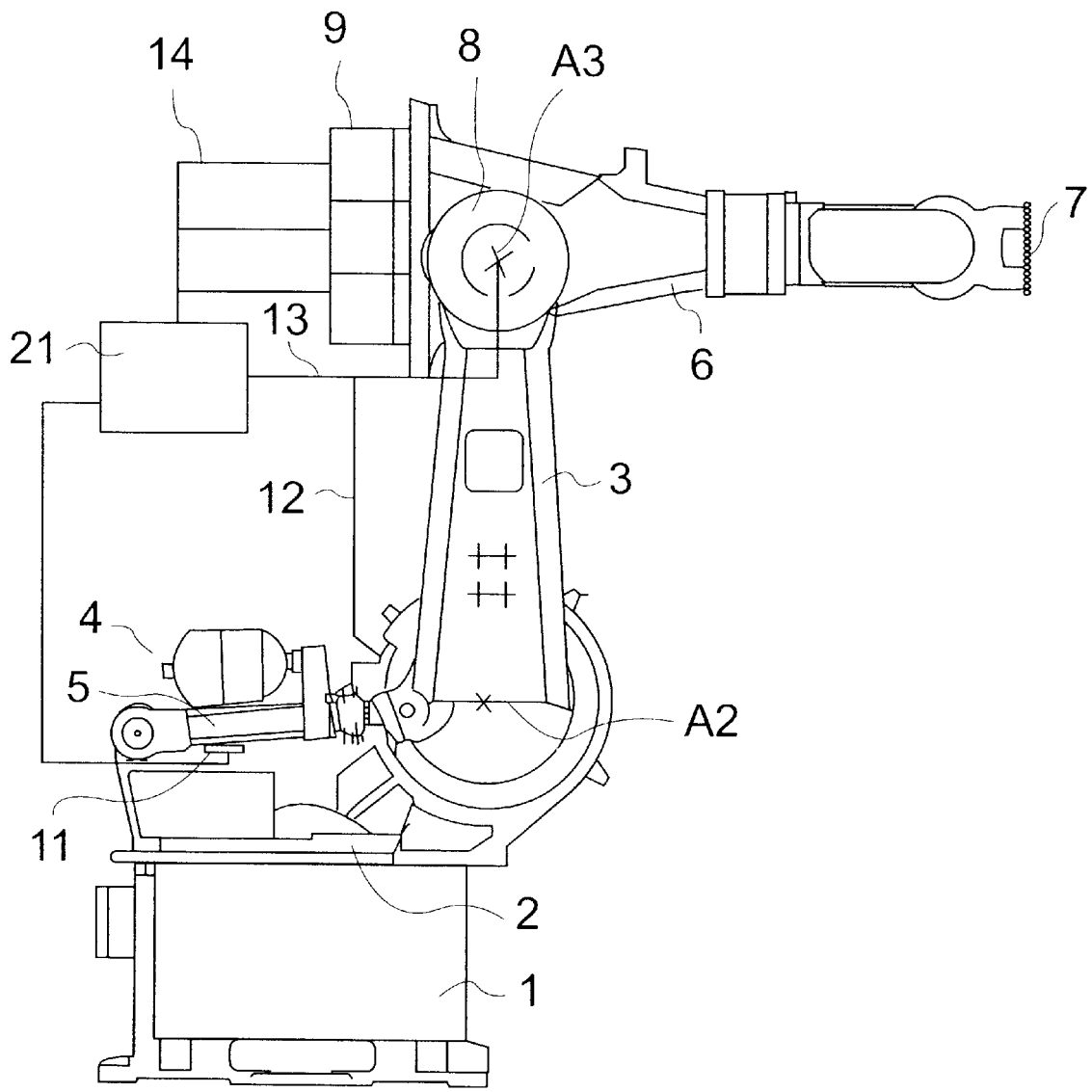

The invention relates to a device for compensating the weight of a robot arm of a robot, having a fluid spring particularly a gas spring, and with a control device for controlling the movements of the robot, as well as to a method for compensating the weight of the robot arm, in which the weight compensation of the robot arm is brought about by a fluid spring, particularly a gas spring and the movements of the robot are controlled.

For compensating static loads a robot is generally provided with a weight compensation device, which can e.g. be constructed as a movable counterweight to the robot arm. For adjusting such a device for weight compensation purposes, it is e.g. known to model the dynamic and static behaviour of the controlled system fixed by the robot mechanics and robot drive mathematically by means of the motion equations for the complete robot. In the motion equations obtained the equilibrium conditions can be set as a function of the position of the robot arm for each coordinate axis. If this equation system is resolved according to the drive moments, the detailed desired pattern of speed and drive moments for present robot are movements are obtained. The desired value obtained in this way can generally be used for precontrol purposes. Whereas in the ideal case, with exact mathematical modelling of the real movement conditions of the robot, no control deviation occurs, in practice a controller is unavoidable in order to compensate the errors of the model. For this purpose it is e.g. necessary to subject the controller, e.g. constructed as a PID controller, using a final control element to the actual movement conditions of the robot, so that the controller is able to readjust the differences. In this way the robot arm can be operated at any time with maximum possible speed or maximum possible acceleration, without exceeding the permitted limits.

For example gas springs are known, which are e.g. as fixed to a robot arm, that in the case of a deflection thereof they undergo compression or stretching and consequently convert the pressure dependent on robot are deflection into a force dependent on said deflection. However, a particular disadvantage when using such gas springs is the fact that the relationship between the deflection and force or tension of a gas spring is only proportional for as long as the behavior of the gas can be approached to the ideal gas equation. Since in particular at higher gas pressures, the gas no longer behaves in an ideal manner and heats on compression and cools on depression, the force produced by means of gas springs has a considerable fluctuation range, which on the one hand leads to a fluctuating load compensation as a result of pressure changes and on the other to an inadequate utilization of the drive resources, because the power limits of the robot must be oriented for safely reasons on the basis of the leaks favorable values. In addition, pressure drops caused by gas spring leas are not detected, which can lead to robot overloading and damage.

Whilst according the aforementioned disadvantages, the problem of the invention is to propose a device and a method for compensating the weight of a robot arm of a robot of the aforementioned type.

In the case of a device of the aforementioned type, the invention solves this problem by a pressure sensor measuring the pressure of the fluid of the fluid spring. For solving the problem, in a robot arm weight compensation method according to the preamble, the pressure of the fluid of the fluid spring is measured.

Through the measurement of the pressure of the gas enclosed in a gas spring it is possible to obtain a value representative of the instantaneous motion state of the robot. The high reliability and precision of such a pressure sensor means that the robot can be drive substantially up to its power limits and therefore works with the maximum efficiency. Another disadvantage is the detection of leaks in the fluid spring by a pressure drop.

In a preferred construction, the pressure sensor according to the invention is connected to one or more limit sensors for producing signals at attained preset pressure limits. Said limit sensor is in turn connected in preferred manner to a protective device for automatically disconnecting the robot drive on passing above and/or below a presettable pressure limit. This reliably avoids overload or damage to the robot, in that in the case of a very high pressure, e.g. is not permitted extreme positions of the robot arm or excessive temperature, or in the case of a very low pressure, e.g. with a leak in the gas spring, the robot drive is automatically disconnected.

In another preferred construction, the robot are weight compensating device has a monitoring device for monitoring the fluid spring pressure measured by the pressure sensor and which is preferably constructed for monitoring the time pressure distribution of the fluid spring so as to permit a predictive diagnosis. It is in particular provided that the monitoring device for monitoring the measured pressure and the time pressure distribution of the fluid spring is constructed as a function of robot arm positions. Such a monitoring device, which monitors the pressure conditions in each robot arm motion phase, permits an adaptation of the motion of movement data by means of readjustment and an optimum utilization of the drive resources. In addition, creeping changes to the pressure and abnormalities in the pressure distribution are detected and consequently e.g. information is obtained to the effect that a robot needs maintenance.

The fluid pressure is preferably monitored for reaching preset limits and the robot drive is disconnected on passing above and/or below a presettable pressure limit, to prevent robot overloading and damage.

According to another preferred construction, the measured pressure and in particular the time pressure distribution of the fluid spring is monitored and both the measured pressure and the time pressure distribution of the fluid spring are monitored as a function of robot arm positions.

In a robot control device its static and dynamic behaviour are mathematically simulated in an a equation system within the framework of a robot model. This makes it possible from moments at the drive (motor) to calculate the moment at the individual driven part with all the influences (gravitation, friction, inertia, centrifugal forces, support forces, etc.), to calculate from the axle position, speed and acceleration the drive moment (motor) necessary for the actual travel or movement situation (moment precontrol and from the axle position and the given, maximum available motor and gear moments to determine the maximum permitted acceleration of all the axles.

Amount is inter alia taken of the mass, centre of gravity, inertia of the robot mechanics components, mass, centre of gravity and inertia of the fitted load (tool, useful load), motor, gear, friction, gravitation, Coriolis, centrifugal and support moments, as well as axle position, speed and acceleration.

Using the aforementioned input values, the model calculates the actual necessary motor moments and supplies then in the sense of a moment precontrol to the drive regulation. This method relieves the drive regulation and consequently improves the static and dynamic precision of the robot. In the ideal case the calculated moments would correspond to the real moments and the drive regulators would become unemployed. In practice the drive regulators only have to compensate the false amounts, which are due to the incompleteness of the model or the imprecision of the preset values.

Apart from the moment precontrol, the model also supplies information to the path planning/travel profile generation module, which ensures that the acceleration and deceleration ramps are always set in such a way that the most loaded axle travels with the permitted maximum speed values. This permit maximum travel dynamics whilst simultaneously respecting the limits.

Hitherto the support force of the weight compensation has been taken into account in principle, in that the spring force of the cylinder is calculated as a function of the axle position. This calculation takes place with preset constants and can consequently not take account of deviations during practical operation. These deviations result from leaks, temperature and/or time pressure distribution due to the adiabatic process.

These imprecisions lead to increased stressing of the control system and fault or error states (incorrect pressure setting, incorrect parameter presetting for the model, strong pressure loss, other damages and malfunctions of the cylinder) are not detected or only when very marked.

To avoid these disadvantages, the pressure sensor according to the invention is consequently connected to the control device of the robot for adapting the motion data of the measured pressure of the fluid spring to parameters of the motion control, so that there is an improvement to the precontrol of the motion data of such a robot and consequently the actual control system is relieved.

The parameters of the motion control of the robot arm are adapted to the measured fluid spring pressure, so that the motion data can be automatically readjusted.

As a result of the measures according to the invention, initially and advantageously there is a relief of the control system through the omission of imprecisions in the calculated pressure value. There is also no need for safety positive or negative supplements, so that the travel dynamics are improved and the robot power limit can be extended. Moreover abnormalities are reliably detected by comparing the measured value with the calculated value. There is also a possibility of recording pressure values in selected situations in a log file for diagnosis and maintenance purposes.

As a result of the inventive, adaptive use of the pressure measurement in the robot control, it is unnecessary to provide a complicated and costly pressure regulation. The pressure spring can be constructed in a purely passive and unregulated form.

Further advantages and features of the invention can be gathered from the claims and the following description of an embodiment of the invention with reference to the attached drawings, wherein show.

FIG. 1 A diagrammatic representation of the mechanical design of a robot arm weight compensating device according to the invention.

Figure 2:
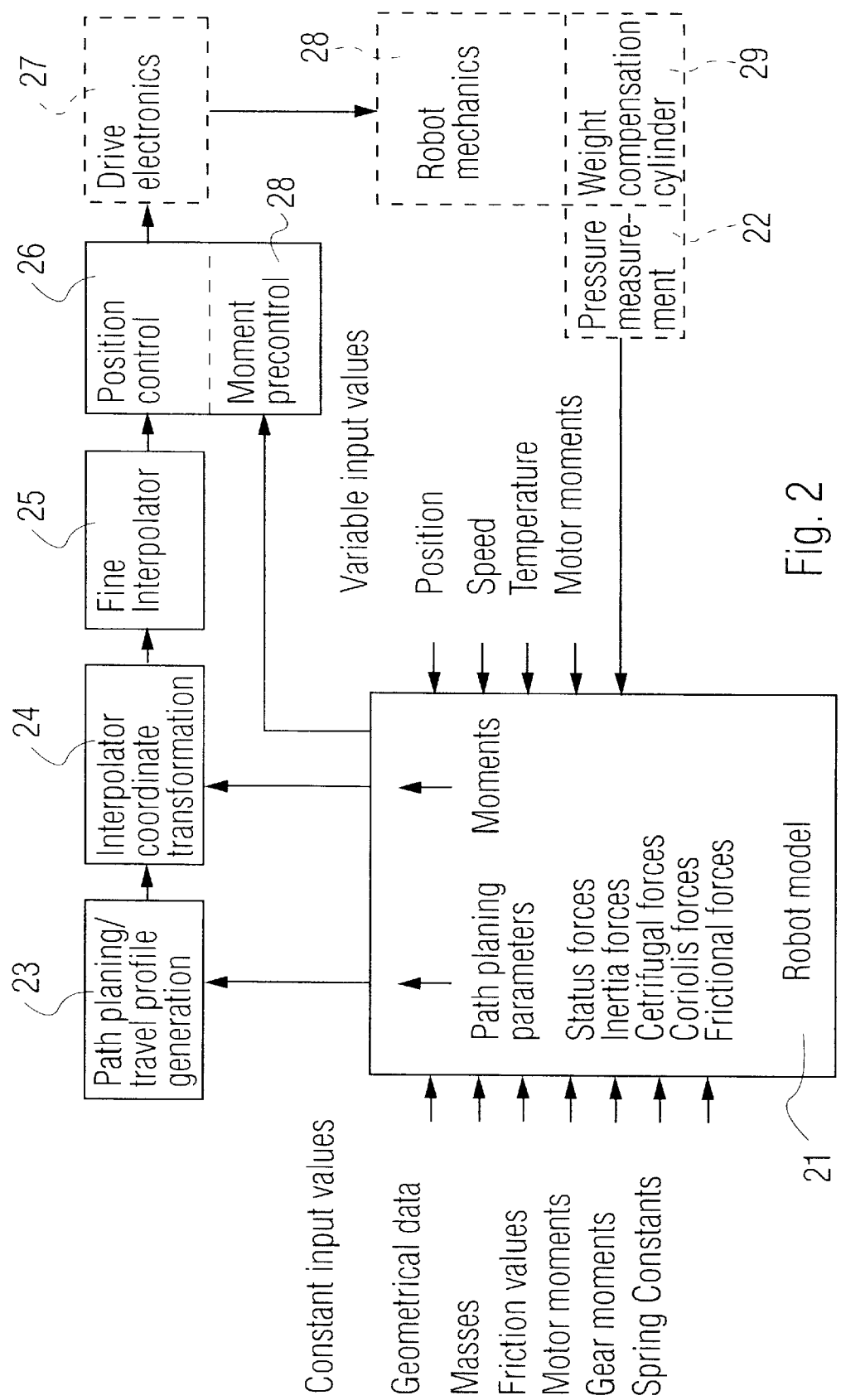

FIG. 2 A block circuit diagram for adaptively binding the fluid spring pressure measured according to the invention into the control of a robot.

Figure 3:
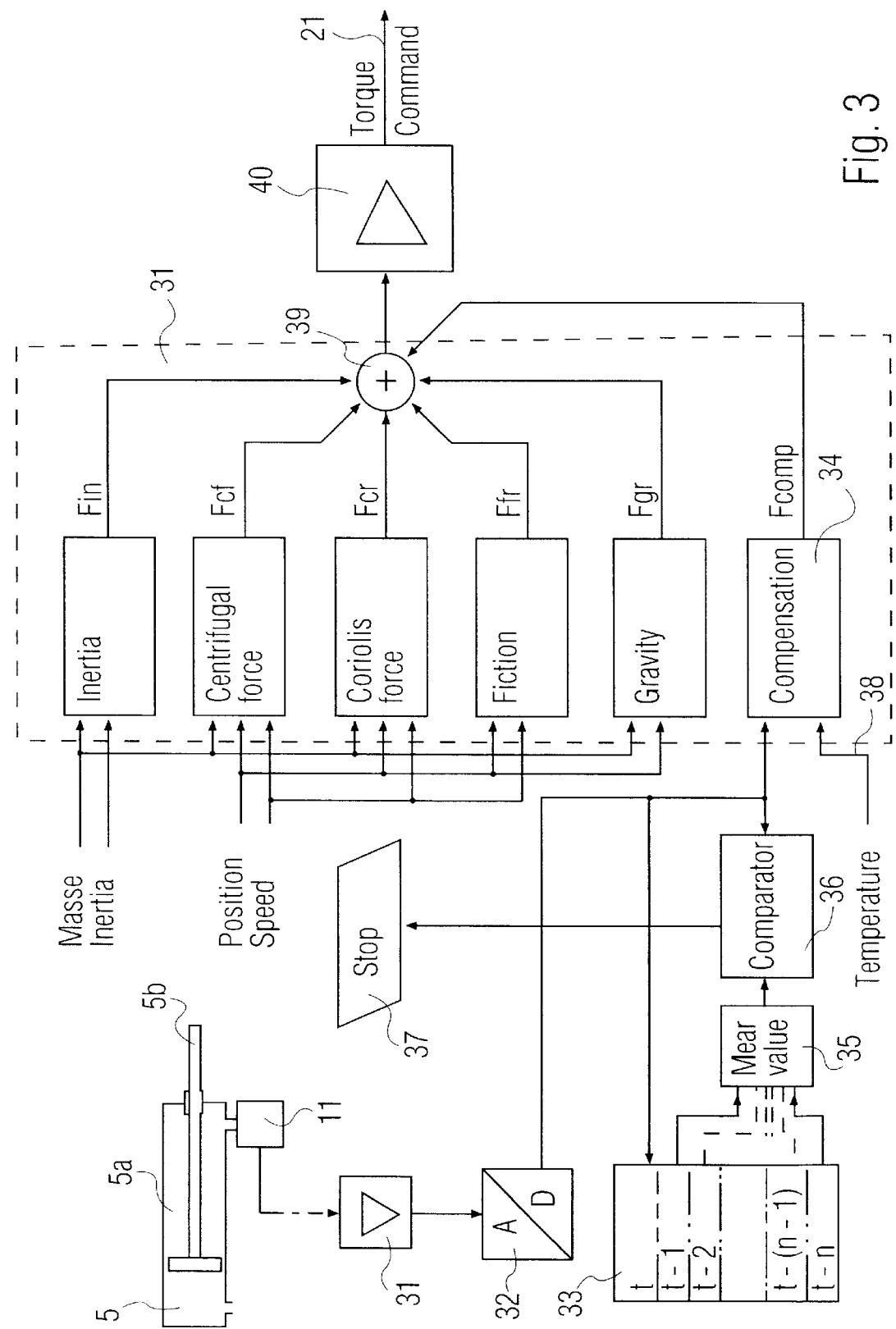

FIG. 3 A more precise and more specific diagrammatic representation concerning the influence of the fluid pressure measurement in the robot control.

FIG. 1 diagrammatically shows a side view of a robot. The latter has a base 1, on which is placed a rotary table 2, by means of which the robot can be rotated by means of a first, not shown motor about its vertical A1 axis. On the rotary table 2 is pivotably arranged about the A2 axis a rocker 3, with which is associated a weight compensation 4 of a fluid spring 5. In order to compensate dead loads, more particularly of the arm 6, the tools located on its front 7 and optionally also loads carried there, said arm 6 is pivotably articulated about the A1 axis to the rocker 3. The rocker 3 is pivotable about the A1 axis by a not shown motor (on the back of the robot opposite to the viewing side) and the arm 6 is pivotably about the A3 axis by a motor 8. On its back remote from the front 7, the arm 6 has three motors 9 for operating a tool to be fitted to the front 7 and for this purpose driving shafts extend through the arm 6. On the fluid spring 5 is located a sensor 11 and its signals are transmitted to a control 21. Further signal lines leading to the latter are not shown in FIG. 1, but can be gathered from FIG. 2. The control 21 has control lines to the different motors and FIG. 1 shows control lines 12 to the not shown motor for driving the rocker 3 about the A2 axis, 13 to motor 8 and 14 to the motors 9.

The robot control is designated 21. The control process takes place on the basis of a series of constant input values and variable input values. Constant input values are e.g. geometrical data, masses, inertia moments, friction values, motor moments, gear moments, spring constants and possibly others. Variable input values are in particular the position of the individual robot components (arms), movable relative to one another, their speed, temperatures and motor moments. The variable input values are determined on the robot by suitable measuring devices, particularly sensors and resolvers (the latter in particular for position and speed determinational and supplied to the robot control 21.

According to the invention the pressure value of the fluid spring measured by a pressure sensor 22 is supplied as a real, variable input value to the control and enters the mathematical robot model for calculating the robot movement. As a result of input data received by the control 21 in this way, namely constant and variable input values, the control process of the robot takes place by means of a path planning and colour profile generation 23, an interpolation and a coordinate transformation 24 and a following fine interpolation of the movement or motion process 25. As a result of the thus obtained control data a position control 26 of the drive electronics 27 takes place and simultaneously a moment precontrol 28 takes place from the control 21. The drive electronics 27 in this way controls the movement of the robot mechanics 28, so that, when a movement is taking place, there is a pressure change in the fluid or weight compensating cylinder 29, which is once again measured by the pressure sensor 22, transferred to the robot control 21 and taken into account during the further robot control movement.

FIG. 3 more specifically shows the constructional mechanical construction of FIG. 1 and the control of FIG. 2. It shows a fluid spring 5 with a cylinder 5a firmly connected to the rotary table 2 and a piston 5b connected to the rocker 3. Thee is once again a pressure sensor 11, which by means of an amplifier 31 and an analog/digital converter 32 is connected on the one hand to a memory 33 and on the other to a compensation unit 34 within the control 21.

The memory 33 stores the time-succeeding pressure values and from them calculation takes place in an averaging unit 35 of the mean value of the measured pressure value stored in the memory 33. This mean value is supplied to a comparator 36, which compares the mean value with the actual pressure value measured by the pressure sensor 11. If the comparison reveals a deviation over and beyond a preset difference, in particular a very significant pressure drop, a stop command 37 takes place, because there is a fault.

In the compensation unit 34 the measured pressure value is temperature-cleared by means of a temperature measurement 38 and enters the movement calculation in the computer 39 of the control device 21 together with other preset or measured values such as inertia, centrifugal. Coriolis and frictional forces, as well as gravity. The control signal is then obtained at the output 41 by means of an amplifier 40.

What is claimed is:

1. A device for compensating a weight of a robot arm of a robot, having a fluid spring with a fluid pressure, particularly a gas spring, and having a control device for controlling movements of the robot and a pressure sensor measuring the pressure of the fluid of the fluid spring.

2. A device according to claim 1, further comprising a limit sensor connected to the pressure sensors for generating signals when the presettable pressure limits are reached.

3. A device according to claim 2, wherein the limit sensor is connected to a protective device of the automatic disconnection of a robot drive on passing above and/or below a presettable pressure limit.

4. A device according to claim 1, further comprising a monitoring device for monitoring the fluid spring pressure measured by the pressure sensor.

5. A device according to claim 4, wherein the monitoring device for monitoring the time pressure distribution of the fluid spring is constructed by diagnosis.

6. A device according to claim 5, wherein the monitoring device for monitoring the measured pressure and the time pressure distribution of the fluid spring is constructed as a function of robot arm positions.

7. A device according to claim 1, wherein the pressure sensor is connected to the robot control device for adapting the motion data of the robot arm on the basis of the measured fluid spring pressure.

8. A method for the weight compensation of a robot arm of a robot, in which a weight compensation of the robot arm is brought about by a fluid spring having a fluid pressure, particularly a gas spring and the robot motions are controlled, wherein the pressure of the fluid of the fluid spring is measured.

9. A method according to claim 8, wherein the fluid pressure is monitored for reaching presettable limits.

10. A method according to claim 9, wherein the robot drive is disconnected on passing above and/or below a presettable pressure limit.

11. A method according to claim 8, wherein the measured fluid spring pressure is monitored.

12. A method according to claim 11, wherein the time pressure distribution of the fluid spring is monitored.

13. A method according to claim 12, wherein the measured pressure and the time pressure distribution of the fluid spring is monitored as a function of the robot arm positions.

14. A method according to claim 8, wherein the parameters of the movement control of the robot arm and adapted to the measured fluid spring pressure.

* * * * *